Aug. 17, 1954  A. C. RUBEY, JR  2,686,383
BAIT CONTAINER
Filed June 2, 1950
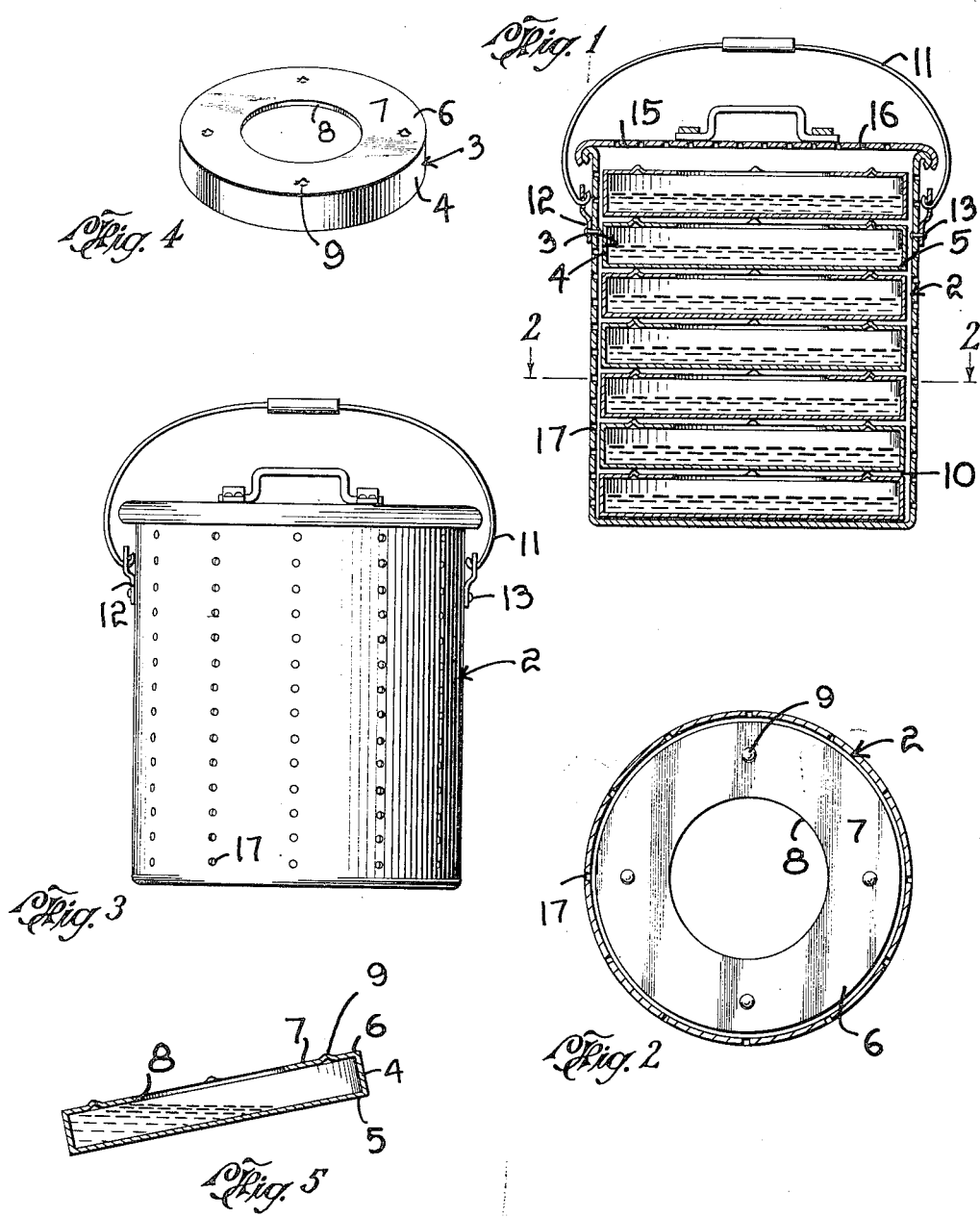
Arthur C. Rubey, Jr.
INVENTOR.
BY Lester B. Clark
Ray L. Smith
ATTORNEYS Patented Aug. 17, 1954

2,686,383

UNITED STATES PATENT OFFICE 2,686,383

BAIT CONTAINER

Arthur C. Rubey, Jr., Houston, Tex.

Application June 2, 1950, Serial No. 165,645

4 Claims. (Cl. 43—55)

The invention relates to a live bait container and more particularly to a container that contains a maximum number of live bait alive for a longer period of time.

Where live bait is retained within a given volume of water, the oxygen consumed by the breathing of the live bait depletes the dissolved oxygen in the water in the container, and unless this oxygen is replenished continuously the live bait dies. Under crowded conditions in an ordinary container, for example, 100 minnows in a conventional two gallon cylindrical bucket, the rate at which oxygen is dissolved at the surface and diffused through the water is too slow to replenish the supply of oxygen being consumed by the bait.

Heretofore this difficulty has been partially overcome by mechanical aeration and/or agitation of the live bait container, and by limiting the number of minnows in a given volume of water, so that the oxygen demand of the minnows does not exceed the rate of absorption of oxygen by the water. In actual practice, however, mechanical agitation means is usually expensive, and often impractical, and limiting the number of minnows or live bait within the given volume is inherently disadvantageous.

It is therefore, an object of the invention to eliminate the above mentioned difficulties.

Another object of the invention is to provide a bait container wherein the bait is kept alive by exposing a larger area of water to the air, per fish.

Another object of the invention is to provide a non-spillable bait container, which can be tilted to almost horizontal position without spilling any water or injuring the bait.

Still another object of the invention is to reduce substantially the size and weight of the container necessary to keep a maximum number of live bait, such as minnow or shrimp, or the like, alive for a longer length of time.

A still further object of the invention is to provide an effective means of continuous aeration of the water, to prolong the life of the bait within the container without the use of chemicals, or mechanical devices for aeration and agitation.

A still further object of the invention is to provide in a live bait bucket a shallow tray of water wherein the water area exposed to air is relatively large per cubic inch of water.

Yet a further object of the invention is to provide a live bait container including a bucket and a plurality of bait trays stacked therein, such trays including bottom and side walls forming a shallow bait container and having an apertured cover to permit ingress of air into each tray and to prevent the bait and water from spilling out of such tray.

A still further object of the invention is to provide a live bait container wherein the live bait within such container is maintained "knee deep" in water, whereby threshing of the live bait in the water will serve to aerate the water in the container and to retain the oxygen supply within the water in an amount sufficient to supply the demand of the bait.

Other objects and advantages of the invention will become more readily apparent from a consideration of the following description and drawing wherein:

Fig. 1 is a vertical sectional view illustrating a form of the invention.

Fig. 2 is a horizontal sectional view on the line 2—2 of Fig. 1, showing the relationship between the stacked tray bait containers and the bucket or housing.

Fig. 3 is an elevational view illustrating one form or configuration that the bucket or housing may take.

Fig. 4 is a perspective view illustrating one form of configuration and construction of the bait trays.

Fig. 5 is a vertical sectional view through one of the trays illustrating the relationship of the water when such tray is tilted.

In Fig. 1 of the drawings the reference numeral 2 designates a hollow housing or bucket adapted to receive a plurality of stacked trays or bait containers 3 therein. Such trays are formed with sidewalls 4 and bottoms 5, which make the shallow tray 6.

Suitable cover means 7 may be provided for the trays, such cover having an opening 8 therein for ingress of air into the trays.

The opening, or aperture 8, in the cover 7 may be of any suitable configuration, and as shown in the drawings, it is located centrally of such cover so that spilling of water and bait from each tray is inhibited when it is tilted from a vertical position. As shown in Fig. 5, the top 7 of the tray, or container 6, may be an integral portion thereof, in order that the top and side walls at their point of juncture are closed against the loss of water therebetween.

When the trays 3 are stacked in the bucket, or housing 2, it is desirable that they be maintained in spaced relationship from each other whereby air may have easy access to each of the trays. To this end there may be provided on the top 7 of the shallow tray or container 6, upstanding or projecting portions 9 to abut against the bottom of an adjacent tray, whereby the space 10 is provided therebetween. Suitable means may be provided on the housing to carry it, and such means may take the form of the bail, or handle 11, secured at each side 12 and 13 of the housing. A cover plate 15 may be provided for the housing, which cover plate may be perforated as illustrated at 16. If desired, additional air holes 17 may be provided in the sides of the bucket or container 2.

Particular attention is directed to the configuration of the tray 6, in that it is rather shallow, so that the amount of water area exposed per cubic inch of water is relatively large. I have found that live bait, such as shrimp, minnows, or the like, will stay alive longer when they are only "knee deep" in water so that when they thresh about, aeration and agitation of the water within the tray will be effected.

By way of comparison, and as an example of the utility of the invention, a two gallon cylinder of water 8 inches in diameter, would have a surface area of about 50.25 square inches, and a depth of about 9.25 inches. Since the bait must have oxygen present in the water to live, it can be readily appreciated that in a container of this size there is little chance for the oxygen to be redisbursed through the body of water, after it has been absorbed therefrom by the bait. As previously pointed out, mechanical or chemical means of aeration of the water is cumbersome and somewhat expensive, and if any great number, say for example, four or five dozen minnows be placed in a container of the above described dimensions they would die rather quickly, probably in less than an hour or two. In the two gallon cylinder of water, example above, the exposed surface per cubic inch of water would be only about $\frac{1}{10}$ of a square inch per cubic inch of water.

However, in a shallow tray of water, such as that disclosed and claimed herein the surface area of water exposed to air is relatively large per cubic inch of water within the container. For example, in a shallow tray 8 inches in diameter and ½ inch deep, the volume would be about 25.13 cubic inches and the area exposed to air is 2 square inches per cubic inch of water, or about twenty times as great as in the deep two gallon cylinder, such as that used heretofore. It can, therefore, be seen that a construction in accordance with the instant invention provides a much larger exposed surface area of water per cubic inch of volume to the air whereby such air may be more easily absorbed into the water and will keep the bait alive for a much longer period of time.

It seems obvious without saying that any suitable number of trays may be provided and that they may take any desired configuration or shape without departing from the scope of the invention.

Broadly the invention relates to a live bait container and more particularly to a live bait container which provides a larger surface area of water within the container which is exposed to air per cubic inch of water within the container.

What is claimed is:

1. A live bait water bucket for carrying live bait, said bucket including a housing, a handle thereon, a plurality of bait containers stacked in said housing, each container comprising a shallow pan having a bottom, a solid, vertically extending side wall, and a top cover, said cover having a central opening therein to provide for ingress of air to said container but to inhibit the spilling of water and bait when the bucket is tilted, said cover having upstanding portions thereon to abut the bottom of an adjacent container in the stack to maintain said containers in spaced relation one from the other for free flow of air through the bucket and each individual tray.

2. A live bait water bucket for carrying live bait wherein a relatively large exposed surface area of water per cubic inch of water in the bucket is provided, said bucket comprising, a hollow housing, a handle thereon to carry the bucket, a plurality of trays stacked in said housing, each tray including a bottom and a solid, vertically extending side wall forming a shallow container to receive the water and live bait, and a top cover for each tray forming a water tight connection with the walls at its point of juncture therewith to prevent spilling water and bait from said tray, said cover having an opening for ingress of air to said tray and additional means being provided on said covers to retain the trays in spaced relation one from the other.

3. A live bait water bucket for carrying live bait wherein a relatively large exposed surface area of water per cubic inch of water in the bucket is provided comprising, a hollow housing, a plurality of trays stacked in said housing, each tray including a bottom and a solid, vertically extending side wall to form a shallow container to receive the water and live bait, and a top cover for each tray to inhibit loss of water and live bait from the tray when the bucket is tilted, said cover having a central opening arranged to be overlaid by the bottom of a tray superposed thereover and spacer formations between the superposed bottom and said cover to maintain an air space passage across the cover and over its central opening.

4. In the storage of live bait by use of a stack of shallow trays having air circulating spaces between adjoining top and bottom of succeeding trays, a storage tray having imperforate side, bottom, and top walls, the top wall being an open center ring to minimize splash loss and spilling on tray tilt and to permit access to the stored bait, the side wall being joined at its top and bottom in sealed relation with the peripheries of the top and bottom walls, and spacer formations on one of the last mentioned walls to insure air circulation across the top wall opening when the tray is in stacked relation and below another similar superposed tray.

References Cited in the file of this patent

UNITED STATES PATENTS

| Number | Name | Date |
| --- | --- | --- |
| 320,454 | Bord | June 23, 1885 |
| 534,207 | Edison | Feb. 12, 1895 |
| 821,040 | Jones | May 22, 1906 |
| 1,853,132 | Love | Apr. 12, 1932 |
| 2,091,695 | Thuma | Aug. 31, 1937 |
| 2,093,307 | Cline | Sept. 14, 1937 |

FOREIGN PATENTS

| Number | Country | Date |
| --- | --- | --- |
| 18,161 | Great Britain | 1899 |